Jan. 30, 1945.　　　F. M. HEATH　　　2,368,219
LEVELING DEVICE FOR COMBINES
Filed May 20, 1943　　　6 Sheets-Sheet 1

F. M. Heath
INVENTOR.
BY C. A. Knowles.
ATTORNEY

Jan. 30, 1945.  F. M. HEATH  2,368,219
LEVELING DEVICE FOR COMBINES
Filed May 20, 1943  6 Sheets-Sheet 4

F. M. Heath INVENTOR.

BY
*C. A. Snow & Co.*
ATTORNEY

Jan. 30, 1945.   F. M. HEATH   2,368,219
LEVELING DEVICE FOR COMBINES
Filed May 20, 1943   6 Sheets-Sheet 5

F. M. Heath INVENTOR.
BY C. A. Snow & Co.
ATTORNEY

Jan. 30, 1945.   F. M. HEATH   2,368,219
LEVELING DEVICE FOR COMBINES
Filed May 20, 1943   6 Sheets-Sheet 6
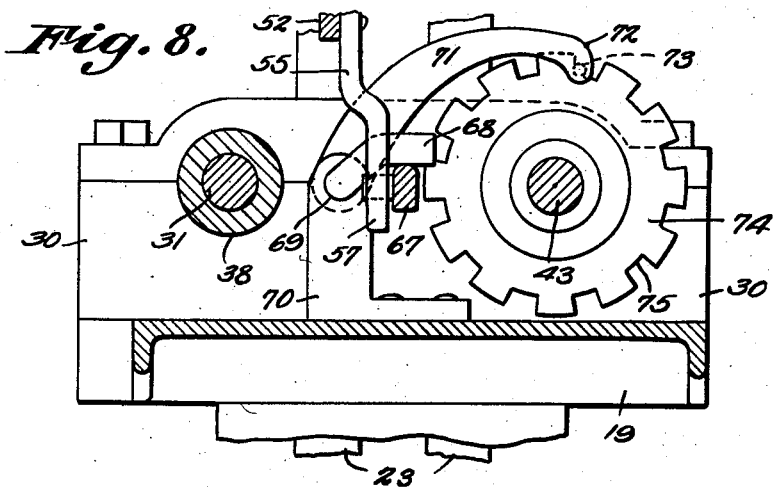
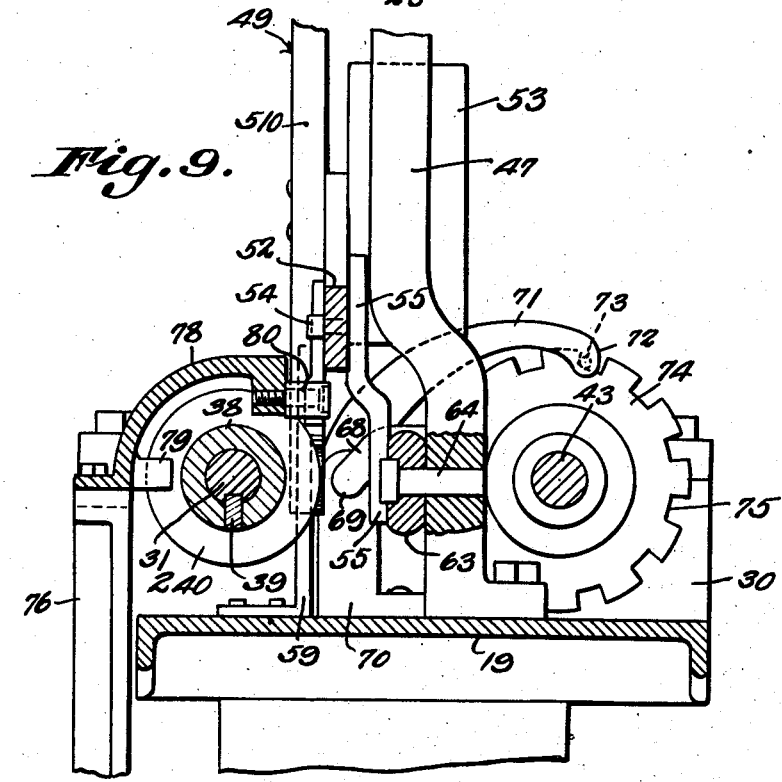
F. M. Heath
INVENTOR.
BY
ATTORNEY Patented Jan. 30, 1945

2,368,219

UNITED STATES PATENT OFFICE 2,368,219

LEVELING DEVICE FOR COMBINES

Frank M. Heath, Silver Spring, Md.

Application May 20, 1943, Serial No. 487,747

9 Claims. (Cl. 56—209)

A combine or similar agricultural machine, moving along a piece of ground having a lateral slope, should ride level. The reasons for the foregoing statement are obvious to those accustomed to have charge of such implements.

Nevertheless, there has arisen a school of thought which holds to the opinion that a lateral tilt in a combine is of no appreciable consequence.

This point of view has no grounding in practical experience. It has arisen out of the circumstance that known devices for leveling a combine do not answer the purpose in all respects and are too complicated. They are not automatic, and at the same time positive in operation. They divide the attention of the operator between several tasks.

In those machines which depend upon the interfitting of teeth of clutch elements, such interfitting has been of a lagging and tardy nature, imposing upon one or both of the clutch parts, a destructive attrition which it cannot endure.

The device forming the subject matter of this application has among its objects, the overcoming of the objectionable features noted, and the provision of a structure for doing so by taking advantage of the principles of gravity, equilibrium and momentum, it being unnecessary to resort to electro-mechanical apparatus, or to parts which call for carefully-made field adjustments.

In the device forming the subject matter of this application, there is no occasion, after a factory adjustment, for relying upon skilled labor to make adjustments, the construction being such that there will be no occasion for the unskilled to tamper with the machine and attempt adjustments which they are not competent to make.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 8 is a section along the line 8—8 of Fig. 5, close to the stop wheel;

Fig. 9 is a view similar to Fig. 8, but taken along the line 9—9 of Fig. 5, parts being broken away.

Figure 1:
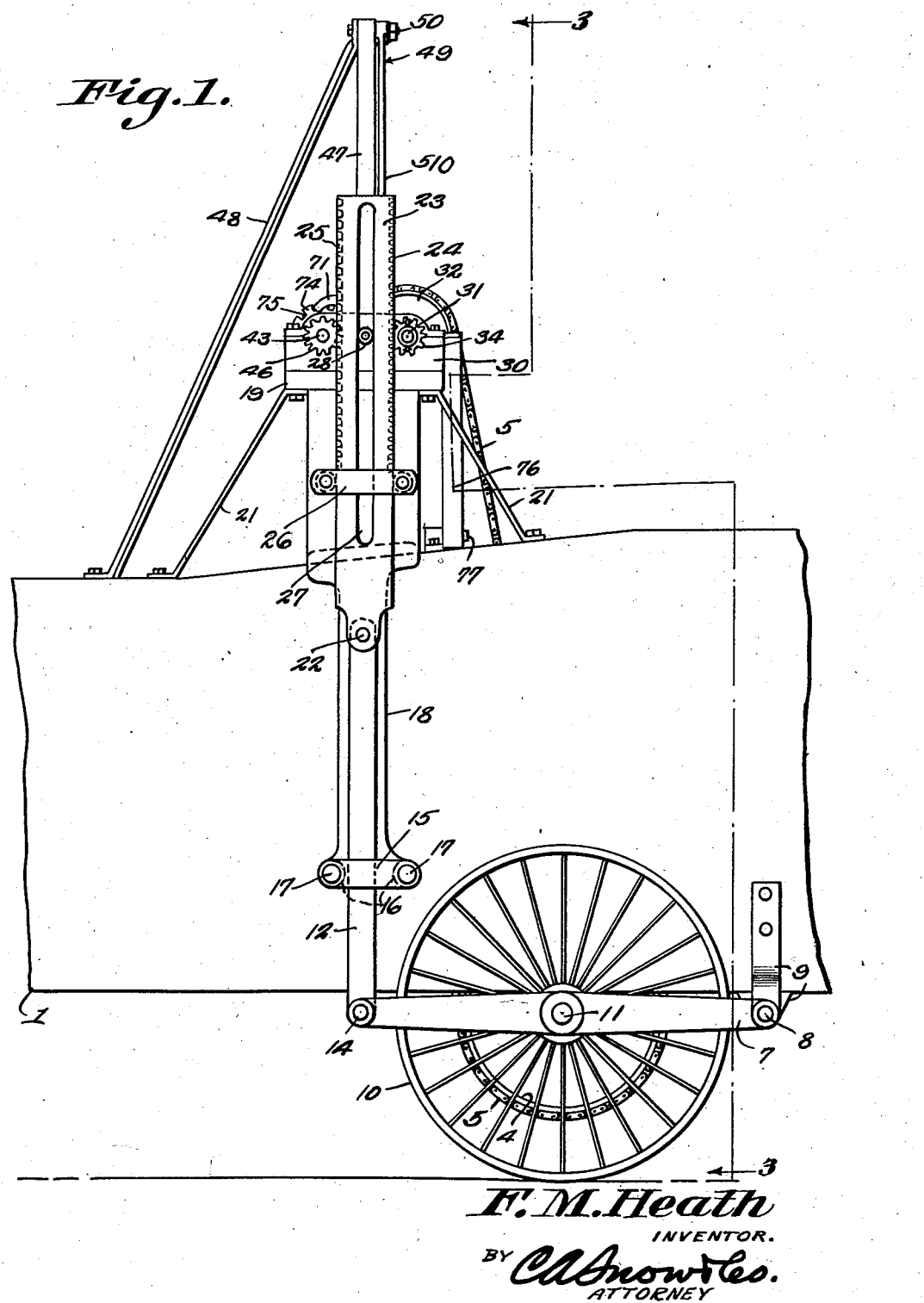
Fig. 1 shows, in side elevation, a device constructed in accordance with the invention.

The device hereinafter described preferably is made of metal throughout, and a judicious selection of material contemplates that rustless metal may be employed wherever desirable, especially in connection with the clutches and associated members.

The frame of the combine, or similar agricultural machine to be leveled, includes a vehicle comprising a body, which is marked by the numeral 1. On one side, the body 1 carries a fixed axle 2 (Figs. 3 and 2), whereon a ground wheel 3 is rotatable. A sprocket wheel 4 is mounted to rotate with the ground wheel 3 and is engaged by a flexible member, such as an upwardly extended sprocket chain 5, maintained in working condition by a tightener 6, of any desired construction, on the body 1.

Figure 2:
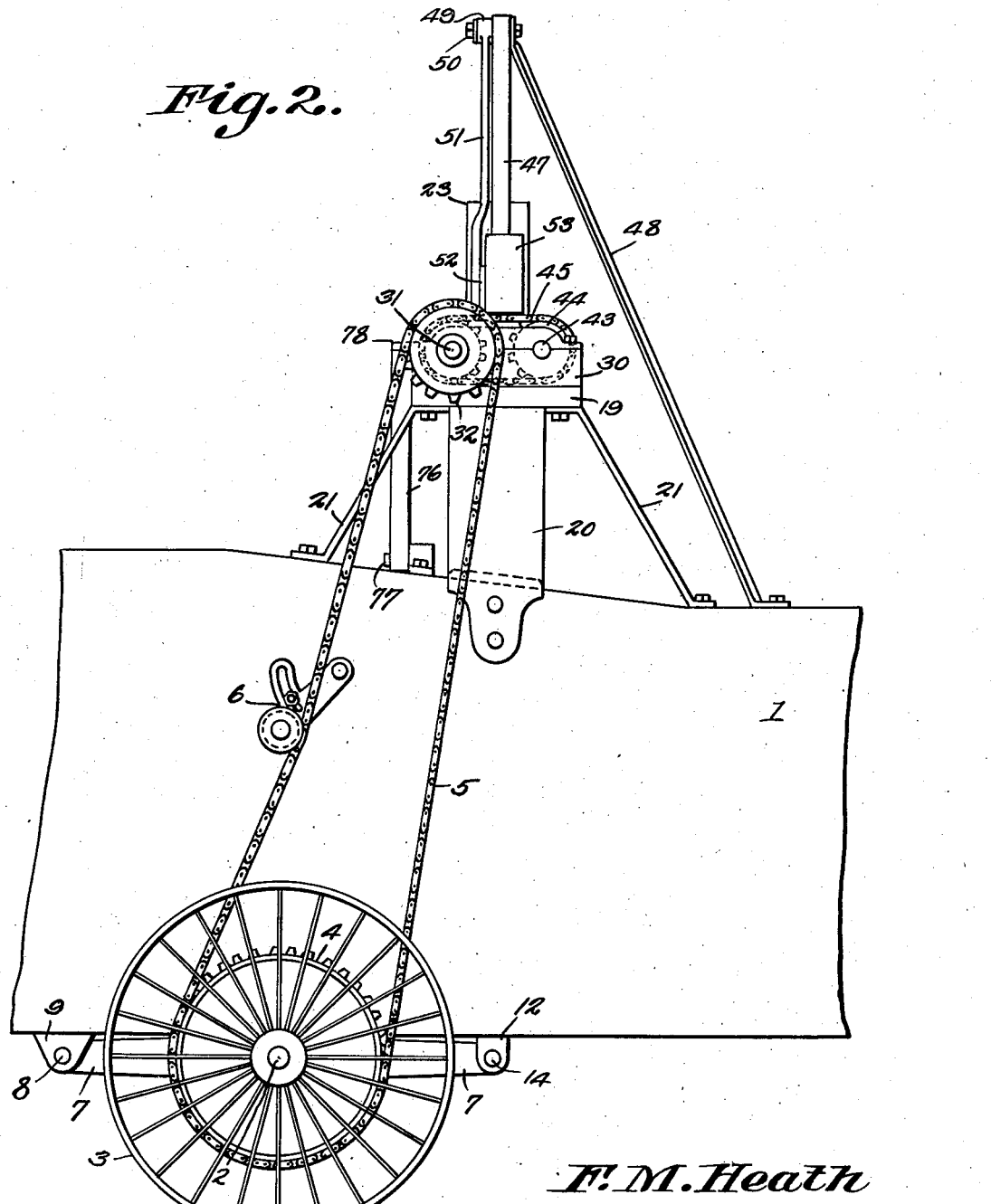
Fig. 2 is a side elevation depicting the opposite portion of the structure from that shown in Fig. 1.
Figure 3:
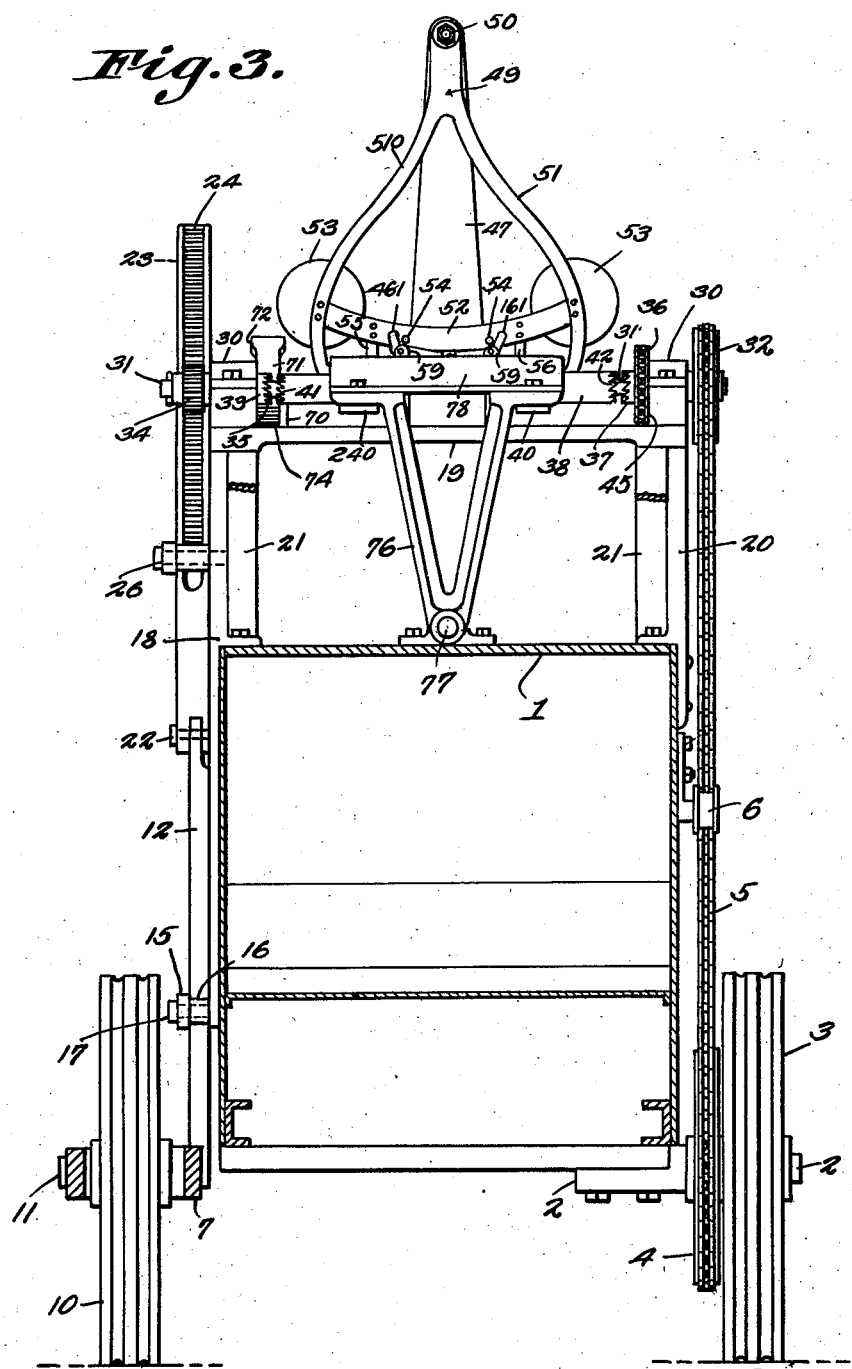
Fig. 3 is a transverse section on the line 3—3 of Fig. 1, and wherein the working parts remain in elevation.

Figure 1 discloses the opposite side of the machine from that appearing in Fig. 2, and on the side of the machine shown in Fig. 1, a radius arm 7 is pivoted at 8 to hangers 9 on the body, for vertical swinging movement, the radius arm extending longitudinally of the body. A ground wheel 10 is mounted at 11 to rotate on the radius arm 7, and is located opposite to the ground wheel 3.

Figure 4:
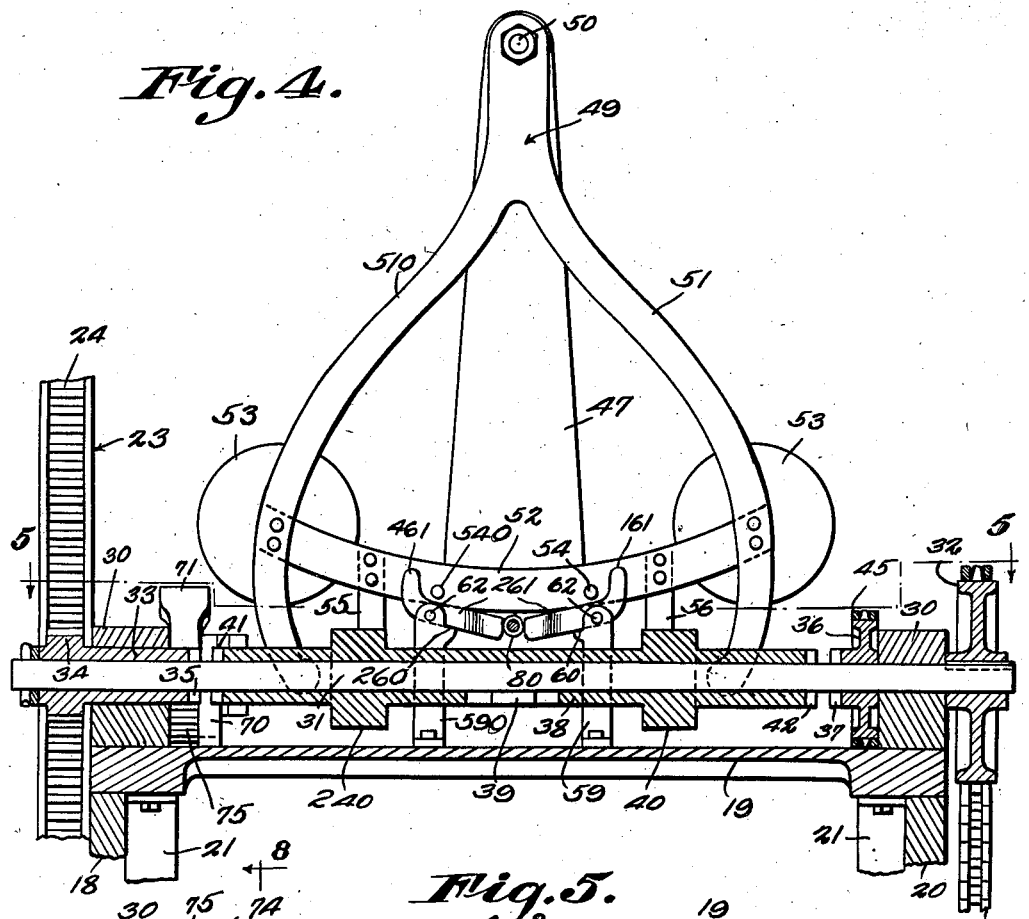
Fig. 4 is a transverse section taken on the line 4—4 of Fig. 5, parts being in elevation.
Figure 5:
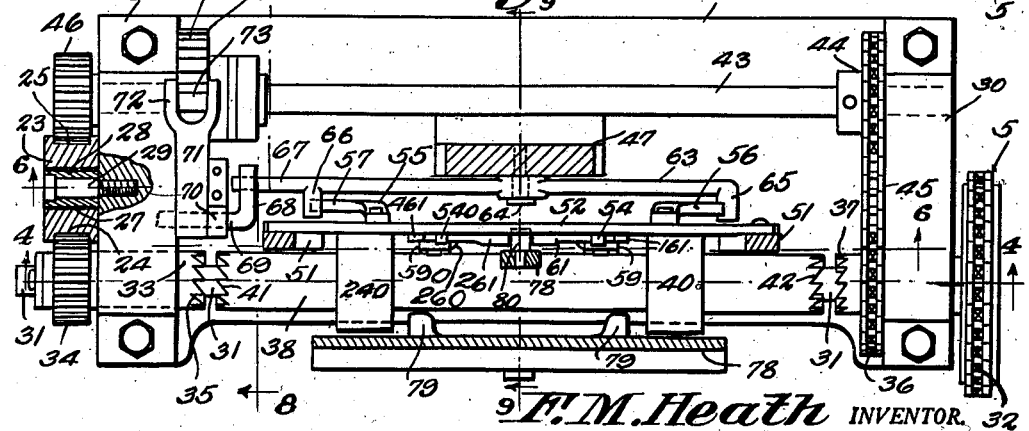
Fig. 5 is a top plan, wherein parts have been sectioned away along the line 5—5 of Fig. 4.

A substantially vertical link 12 is provided, the lower end of the link being pivoted at 14 to the vertically movable end of the radius arm 7. The link 12 is mounted to move below a lower strap 15, and between anti-friction rollers 16, both the strap and the rollers being attached as shown at 17 to the lower end of a standard 18. A horizontal cap plate 19, well shown in Figs. 4 and 5, is secured at one end to the standard 18, the end of the cap plate remote from the standard 18 being supported from the body 1 by a short standard 20 thereon. The parts 18, 19 and 20 constitute an upright frame structure on the body 1, sustained by front-to-back braces 21, connected to the body and to the cap plate 19.

The upper end of the link 12 is pivoted at 22 (Figs. 1 and 3) to the lower end of an upwardly-extended bar 23, having racks 24 and 25 on its opposite edges. The rack bar 23 has right line sliding movement in a guide 26 on the standard 18, the guide being of the strap and roller construction shown at 15—16 and hereinbefore described. The right line movement of the rack bar 23 is the more markedly promoted, in that it has a longitudinal slot 27 (Fig. 1), receiving a roller 28 (Fig. 5) journaled on a stub shaft 29, fixed in one of two bearings 30 which are secured to the cap plate 19.

Noting Fig. 1 for purposes of general location, and Fig. 4 for details is, a main transverse shaft 31 is supported in the bearings 30, and to it is fixed a sprocket wheel 32 (Fig. 2), wherewith is engaged the sprocket chain 5 which is driven by the sprocket wheel 4 and the ground wheel 3. The shaft 31 rotates continuously, and is a driving means for raising and lowering one side of the body 1 intermittently, by way of the rack bar 23, the link 12 and the radius arm 7.

The shaft 31 is mounted to rotate in the right hand bearing 30 of Fig. 4, and in the tubular hub 33 of a pinion 34, the hub being journaled in the left hand bearing of Fig. 4. The pinion 34 meshes with the rack 24 of the bar 23. At its inner end, the tubular hub 33 is supplied with a toothed clutch member 35 (Fig. 5). The main shaft 31 rotates in a sprocket wheel 36 (Fig. 4), disposed inwardly of the bearing 30 that is adjacent to the sprocket wheel 32. The hub of the sprocket wheel 36 is provided with an inwardly facing, toothed clutch member 37.

A shiftable element or sleeve 38 is mounted for longitudinal adjustment on the intermediate portion of the main shaft 31, but is splined at 39 (Figs. 4 and 9) to the shaft, for rotation therewith. On opposite sides of the spline structure 39, the shaft 31 is equipped with fixed, annular shoulders 40 and 240. A toothed clutch member 41 is located on one end of the sleeve 38 and is spaced from the clutch member 35 on the tubular hub 33 of the pinion 34, but is adapted to engage with the clutch member 35. On the opposite end of the sleeve 38 is a toothed clutch member 42, adapted to cooperate with the clutch member 37 on the hub of the sprocket wheel 36.

Disposed in parallel relation to the main shaft 31 (Fig. 5), and journaled in the bearings 30, is an auxiliary shaft 43. A sprocket wheel 44 (Figs. 5 and 1) is secured to the shaft 43, a sprocket chain 45 forming an operative connection between the sprocket wheel 44 and the sprocket wheel 36 which is loose on the main shaft 31. Having compared Figs. 1 and 5, the reader will note that a pinion 46 is secured to the shaft 43 and meshes with the rack 25 of the vertically movable bar 23.

A vertical post 47 (Fig. 4) is secured at its lower end to the cap plate 19 of the frame and is maintained in an upright portion with respect to the body 1 by a brace 48 appearing in Fig. 1. A pendulum 49 (Fig. 4) is provided, and preferably is pivoted at its upper end to the post 47, as shown at 50, for swinging movement in a plane parallel to the shafts 31 and 43. The pendulum comprises depending arms 51 and 510, the upper portions of which diverge downwardly, the lower portions of the arms being outwardly convexed, so that the lower terminals of the arms are presented somewhat prominently toward each other. The lower ends of the pendulum arms 51 and 510 are disposed outwardly of the shoulders 40 and 240 of the shiftable sleeve 38.

Slightly above their lower extremities, the pendulum arms 51 and 510 are united by a rigid tie 52 (Fig. 4), weights 53 of considerable mass being secured to the pendulum 49 at the places where the tie is joined to the arms. The tie 52 is provided with transversely-spaced, outstanding projections 54 and 540, located on opposite sides of a vertical plane passing through the pendulum suspension 50. Depending fingers 55 and 56 (Fig. 6) are secured to the tie 52 of the pendulum 49, outwardly of the projections 54 and 540, the finger 55 having a downwardly and outwardly inclined upper edge 57, and the finger 56 having an upwardly and outwardly inclined lower edge 58.

Supports 59 and 590 (Fig. 7) are erected on the fixed cap plate 19 of the frame, and have respectively, substantially horizontal shoulders 60 and 260. Latches 61 and 261 are pivotally mounted intermediate their ends, as at 62 and 620, on the supports 59 and 590, respectively, and the inner end portions of the latches are sufficiently heavy so that they will rest on the shoulders 60 and 260, with the upturned outer ends 161 and 461 of the latches 61 and 261, respectively, disposed outwardly of the respective projections 54 and 540 on the tie member 52 of the pendulum 49, and in the path of the projections 54 and 540 respectively.

A lever 63 of the first order (Figs. 6 and 7) is fulcrumed at 64 on the post 47, and is supplied with outstanding projections 65 and 66, so located as to be engaged, respectively, by the edge 58 of the finger 56 on the tie portion 52 of the pendulum 49, and by the edge 57 of the finger 55 thereon. The lever 63 extends a short distance outwardly and laterally with respect to the projection 66, as shown at 67.

The end portion 67 of the lever 63 engages a crank arm 68 (Figs. 8, 5 and 6), which is fixed to a short shaft 69, disposed parallel to the shafts 31 and 43 and journaled in the left hand bearing 30 of Fig. 5 and in a supplementing bearing 70 (Fig. 9) on the cap plate 19.

A dog 71 (Fig. 8) is secured to the shaft 69 and terminates in a fork 72 (Fig. 5) carrying a cross pin 73. The fork 72 receives the periphery of a stop wheel 74, having marginal seats 75 for the reception of the cross pin 73. The stop wheel 74 is secured to the auxiliary shaft 43.

A V-shaped impeller 76 (Fig. 3) is pivotally mounted at 77 on the body 1 of the combine, to swing transversely thereof, and is disposed below the pendulum 49. The impeller 76 includes an overhanging top piece 78, supplied with horizontally projecting lugs 79 (Fig. 5), disposed between the shoulders 40 and 240 on the longitudinally-shiftable sleeve 38, in adjacent relation thereto, but spaced horizontally therefrom. The top piece 78 of the impeller 76 carries a roller projection 80 (Figs. 6 and 9) disposed between, but remote from, the lugs 79, and adapted to be located between the inner ends of the latches 61 and 261 which are supported at 59—590—62—620 from the combine body 1. (See Fig. 4.)

Figure 6:
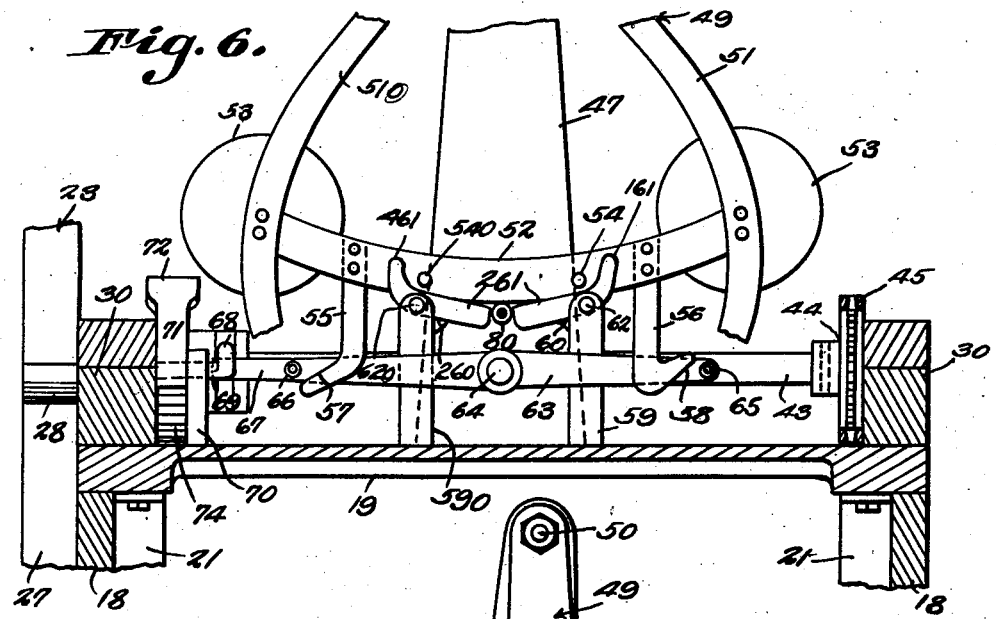
Fig. 6 is a transverse section taken in a plane closer to the pendulum than the section plane in Fig. 4 and along the line 6—6 of Fig. 5.

Referring especially to Figs. 6 and 4, suppose that the combine is running on a practically level surface. The ends 161 and 461 of the latches 61 and 261 are spaced from the projections 54 and 540 of the pendulum 49, the lower ends of the pendulum arms 51 and 510 are spaced from the shoulders 40 and 240 on the shiftable sleeve 38, the edge 58 of the pendulum finger 56 is spaced from the roller 65 on the lever 63, the edge 57 of the pendulum finger 55 is spaced from the roller 66, the sleeve clutch 42 (Fig. 5) is spaced from the clutch 37 of the free sprocket wheel 36, and the sleeve clutch 41 is spaced from the clutch 35 of the pinion 34.

The dog 71 (Fig. 8) is engaged with the stop wheel 74, the shaft 43 and the pinion 46 (Fig. 5) cannot rotate, the pinion 46 is engaged with the rack 25 of the bar 23 (Fig. 1), and the body 1 of the combine is held in a level position.

Whilst the parts are in the positions specified, the pendulum 49 can oscillate through an arc of small degree without actuating anything. This is desirable because the combine tilts laterally, most of the time, to an extent so small that reduction to level is not necessary, and there is, therefore, no occasion for wearing the parts by continuous motion when there is no practical reason for leveling the combine.

Figure 7:
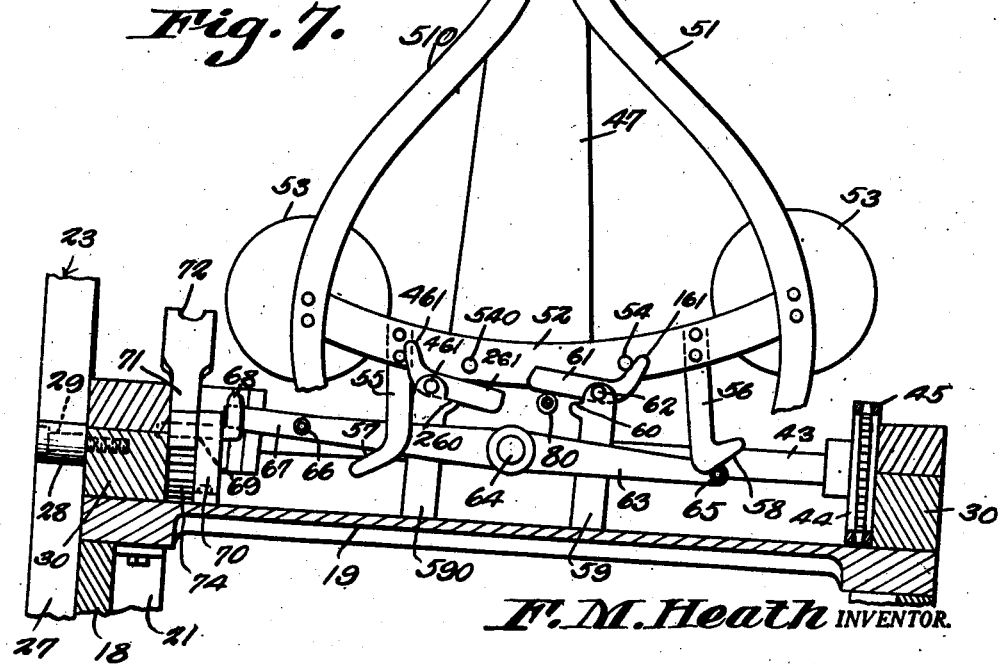
Fig. 7 is a sectional view on the line 6—6 of Fig. 5, but showing the parts as they will appear when the combine is tilted laterally.

Presume that the combine has tilted to the position of Fig. 7, a position exemplary of any position in which a leveling of the combine is required.

The pendulum 49 swings to the right in Fig. 7, the lower end of the arm 51 (Fig. 4) of the pendulum engages the left hand shoulder 40 of the sleeve 38 and moves the sleeve to the right until the clutch teeth 42 (Fig. 4) of the sleeve are in close relation to the teeth 37 of the sprocket wheel 36, but to no extent entered therebetween or engaged therewith.

The projection 80 on the impeller 76 (Fig. 3) is still between the lower ends of the latches 61 and 261, and the impeller is tilted over a little to the right, so that it will exert its inertia force to the right, as hereinafter explained. Noting Fig. 5, as the lower end of the arm 51 of the pendulum 49 engages the shoulder 40 of the sleeve 38, the shoulder engages the left hand lug 79 on impeller 76, to effect the aforesaid tilting, but the space between the right hand lug 79 and the right hand shoulder 40 is doubled in extent. The reason for this condition will be made manifest in the next paragraph hereinafter.

As the pendulum 49 moves to the right, the projection 54 on the pendulum engages the upstanding end 161 of the latch 61 and raises the inner end of that latch so that the projection 80 can pass beneath it, as in Fig. 7. The impeller 76 swings to the right, and because the shoulder 40 on the sleeve 38 is twice the distance that it was formerly from the right hand lug 79, said lug imparts a hammer-like blow to the sleeve-shoulder 40, and the clutch teeth 42 of the sleeve are moved with great rapidity into mesh with the clutch teeth 37 of the sprocket wheel 36. In this connection it should be recalled that, as hereinbefore explained, the sleeve clutch 42 has been moved up close to the sprocket wheel clutch 37, and the impeller 76 is not called upon to impart a long throw to the sleeve 38 in order to bring the clutches 42 and 37 into engagement.

The description of the operation may profitably be suspended at this place to emphasize one of the salient features of the invention, to wit, the quick hold that the clutch 42 acquires on the clutch 37. There is no clashing or grinding of clutch teeth, a consideration which has detracted from the usefulness of many machines of the prior art, and put them early in a condition calling for repairs. Resort has been had to springs, magnetic clutches and other expedients, but there has been no satisfactory solution of the problem heretofore, due partly to structural shortcomings and partly to complicated machinery incapable of field repair, and especially in the absence of highly skilled mechanical experience.

As thus far described, there has been established a driving train embodying the ground wheel 3, the sprocket wheel 4, the chain 5 and the sprocket wheel 32 of Fig. 1, rotation having been imparted to the main shaft 31. The sleeve 38 is coupled by the spline 39 to the shaft, and the sprocket wheel 36 is coupled to the shaft by the clutch elements 42 and 37 of Fig. 5. Under conditions next to be described, rotation may be imparted to the auxiliary shaft 43, by way of the sprocket wheel 36, the chain 45 and the sprocket wheel 44: but prior thereto, the dog 71 (Fig. 8) on the short shaft 69 must be disengaged from the stop wheel 74 on the auxiliary shaft 43.

As the pendulum 49 (Fig. 7) moves to the right (Fig. 6), the edge 58 of the pendulum finger 56 rides the projection 65 on the lever 63 and tilts the lever. The end portion 67 of the lever 63 cooperates (Fig. 8) with the crank arm 68 on the shaft 69 and rotates that shaft, the dog 71 being freed from the wheel 74.

In order to promote a clear understanding of the working of the machine, the operation of the parts shown in Figs. 6 to 9 has been set forth step by step, but in practice the operation is substantially continuous, the intervals being such only as are necessary for proper timing.

The dog 72 (Fig. 8) having been freed from the wheel 74, the shaft 43 is free to rotate, and with it the pinion 46 of Fig. 5. The pinion 46, cooperating with the rack 25 of the bar 23, actuates the bar, the link 12, and the radius arm 7 of Fig. 1, to level the machine.

As the machine becomes leveled, the pendulum 49 swings back to the vertical position of Fig. 4, and by the resulting reversed operation, the parts are returned to the positions of that figure, the dog 71 having been restored to engagement with the wheel 74, to maintain the leveling that has been attained.

Figure 7 shows the machine as having been subjected to a right hand tilt. The operation incident to a left hand tilt is substantially the same as that hereinbefore set forth, and it is necessary to do no more than to catalogue certain parts that then come into play: for example, the latch 261 and the pendulum projection 540 of Fig. 6, the finger 55, the edge 57 thereof and the projection 66 on the lever 63, those parts coacting to free the dog 71 from the wheel 74. The clutch parts 41 and 35 of Fig. 5 are engaged, to cause the pinion 34 to act on the rack 24 of the bar 23. The clutch parts 42 and 37 are disengaged and the shaft 43 and the pinion 46 receive no drive, the pinion 46 offering no obstacle to the actuation of the rack bar 23 through the instrumentality of the pinion 46.

The shaft 31 is a driven shaft. The pinion 34 and its tubular hub 33 constitute a part supported for rotation and having a clutch element. The sleeve 38 forms a slide mounted for rotation with the shaft 31 and for reciprocation longitudinally of the shaft. The means for rotating the shaft 31 is represented by the ground wheel 3 and associated parts of Fig. 2. The raising and lowering mechanism is depicted in Fig. 1 and includes the radius arm 7, the rack bar 23 and the link 12. The latches 61 and 261, the projections 54 and 54a on the pendulum 49, and the projection or detent 80 on the impeller 76, constitute means for releasably engaging the impeller with the pendulum 49. The dog 71 and the stop wheel 74 form a releasable means for holding the auxiliary shaft 43 against rotation.

What is claimed is:

1. In a leveling device for an agricultural machine, a vehicle, a driven shaft supported for rotation on the vehicle, a part supported for rotation on the vehicle and having a clutch member, a slide mounted on the shaft for rotation therewith and having a clutch member, the slide being mounted for reciprocation longitudinally of the shaft to bring the clutch members of the slide and of said part into engagement, a pendulum mounted for swinging movement on the vehicle, the pendulum and the slide having elements which interengage to advance the slide until the clutch member thereof is close to the clutch member of said part but out of engagement therewith, an impeller movably mounted on the vehicle, means for releasably engaging the impeller with the pendulum, the impeller and the slide having elements which interengage, after the impeller is released, to impart abrupt movement to the slide, longitudinally of the shaft, thereby to bring the clutch members of the slide and of said part quickly into engagement after the slide has been advanced as aforesaid, means for rotating the shaft, a ground wheel carried by the vehicle, and a raising and lowering mechanism operatively connecting said part with the ground wheel.

2. In a leveling device for an agricultural machine, a vehicle, a driven shaft supported for rotation on the vehicle, a part supported for rotation on the shaft and having a clutch member, a sleeve having a clutch member, the sleeve being splined to the shaft for rotation therewith, and for sliding movement longitudinally thereof to bring the clutch members into engagement, a pendulum mounted for swinging movement on the vehicle, the pendulum and the sleeve having elements which interengage to advance the sleeve until the clutch member thereof is close to the clutch member of said part but out of engagement therewith, an impeller movably mounted on the vehicle, means for releasably engaging the impeller with the pendulum, the impeller and the sleeve having elements which interengage, after the impeller is released, to impart abrupt movement to the sleeve and to bring the clutch members of the sleeve and of said part quickly into engagement after the sleeve has been advanced as aforesaid, means for rotating the shaft, a ground wheel carried by the vehicle, and a raising and lowering mechanism operatively connecting said part with the ground wheel.

3. In a leveling device for an agricultural machine, a vehicle, a driven shaft supported for rotation on the vehicle, a part supported for rotation on the vehicle and having a clutch member, a slide having a clutch member, means for connecting the slide with the shaft for rotation therewith and for reciprocation longitudinally of the shaft to bring the clutch members of the slide and of said part into engagement, a pendulum mounted for swinging movement on the vehicle, the pendulum and the slide having elements which interengage to advance the slide until the clutch member thereof is close to the clutch member of said part but out of engagement therewith, an inertia, gravity-actuated impeller, means for mounting the impeller directly but movably on the vehicle, means for releasably engaging the impeller with the pendulum, the impeller and the slide having elements which interengage, after the pendulum is released, to impart abrupt movement to the slide and to bring the clutch members quickly into engagement after the slide has been advanced as aforesaid, means for rotating the shaft, a ground wheel carried by the vehicle, and a raising and lowering mechanism operatively connecting said part with the ground wheel.

4. In a leveling device for an agricultural machine, a vehicle, a driven shaft supported for rotation on the vehicle, a part supported for rotation on the vehicle and having a clutch member, a slide having a clutch member, means for connecting the slide with the shaft for rotation therewith, and for reciprocation longitudinally of the shaft to bring the clutch members of the slide and of said part into engagement, a pendulum mounted for swinging movement on the vehicle, the pendulum and the slide having elements which interengage to advance the slide until the clutch member thereof is close to the clutch member of said part but out of engagement therewith, an impeller, means for mounting the impeller pivotally at its lower end on the vehicle for swinging movement transversely of the vehicle, means for releasably engaging the impeller with the pendulum, the impeller and the slide having elements which interengage, after the pendulum is released, to impart abrupt movement to the slide and to bring the clutch members quickly into engagement after the slide has been advanced as aforesaid, means for rotating the shaft, a ground wheel carried by the vehicle, and a raising and lowering mechanism operatively connecting said part with the ground wheel.

5. In a leveling device for an agricultural machine, a vehicle, a driven shaft supported for rotation on the vehicle, a part supported for rotation on the vehicle and having a clutch member, a slide having a clutch member, means for connecting the slide with the shaft for rotation therewith, and for reciprocation longitudinally of the shaft to bring the clutch members into engagement, a pendulum mounted for swinging movement on the vehicle, the pendulum and the slide having elements which interengage, to advance the slide until the clutch member thereof is close to the clutch member of said part but out of engagement therewith, an impeller movably mounted on the vehicle, a latch, means for movably supporting the latch upon the vehicle, the impeller comprising a detent engageable with the latch, to hold the impeller for limited movement, and an element on the pendulum and engageable with the latch when the bounds of said limited movement are exceeded, thereby to free the latch from the impeller, the impeller and the slide having elements which interengage, to impart abrupt movement to the slide, thereby to bring the clutch members quickly into engagement after the slide has been advanced as aforesaid, means for rotating the shaft, a ground wheel carried by the vehicle, and a raising and lowering mechanism operatively connecting said part with the ground wheel.

6. In a leveling device for an agricultural machine, a vehicle, main and auxiliary shafts supported for rotation on the vehicle, an operative connection between the shafts and including a rotatable member loose on the main shaft and having a clutch piece, means for rotating the main shaft, a ground wheel carried by the vehicle, a raising and lowering mechanism operatively connecting the auxiliary shaft with the ground wheel, releasable means for holding the auxiliary shaft against rotation, a slide having a clutch piece, means for mounting the slide for rotation on the main shaft, and for reciprocation longitudinally of the main shaft to bring the clutch pieces into engagement, a pendulum mounted for swinging movement on the vehicle, the pendulum and the slide having elements which interengage to advance the slide until the clutch piece thereof is close to the clutch piece of the loose, rotatable member but out of engagement therewith, an impeller movably mounted on the vehicle, means for releasably engaging the impeller with the pendulum, the impeller and the slide having elements which interengage, after the impeller is released, to impart abrupt movement to the slide and to bring the clutch pieces quickly into engagement after the slide has been advanced as aforesaid, and mechanism for setting the holding means free, the last-specified mechanism and the pendulum having interengageable parts coacting to impart movement to the holding means, from the pendulum.

7. A leveling device for an agricultural machine, constructed as set forth in claim 6, and wherein the holding means comprises a shaft supported for rocking movement on the vehicle, and having a crank arm, a wheel secured to the auxiliary shaft, a dog carried by the crank-arm shaft and engageable with the last-specified wheel, a lever cooperating with the crank arm and fulcrumed on the vehicle, and interengaging elements on the pendulum and on the lever and coacting to impart movement to the lever, from the pendulum.

8. In a leveling device for an agricultural machine, a vehicle, a ground wheel carried by the vehicle, a raising and lowering mechanism operatively connected with the ground wheel and comprising a bar supported on the vehicle for reciprocation and having opposed racks, a main shaft supported for rotation on the vehicle, an auxiliary shaft supported for rotation on the vehicle, an operative connection between the shafts and including a rotatable member loose on the main shaft, means for rotating the main shaft, a pinion on the auxiliary shaft and meshing with one rack, a pinion loose on the main shaft and meshing with the other rack, a pendulum mounted for swinging movement on the vehicle, and means operated by the pendulum for coupling the rotatable member and the loose pinion, one at a time, to the main shaft, as the pendulum swings in opposite directions.

9. In a leveling device for an agricultural machine, a vehicle, a driving mechanism and a raising and lowering mechanism on the vehicle, a pendulum mounted for swinging movement on the vehicle, an impeller pivotally mounted at its lower end on the vehicle, a movable coupling means having coupling parts coacting with the driving mechanism and the raising and lowering mechanism, one at a time, and a means for connecting the impeller to the pendulum, the last-specified means being releasable, to set the impeller free, whereby the impeller will move relatively to the pendulum and impart an abrupt, coupling blow to the movable coupling means.

FRANK M. HEATH.